Feb. 4, 1969 E. ASCOLI 3,426,215

PROCESS AND DEVICE FOR PRODUCING FOUR SUBSTANTIALLY SINUSOIDAL VOLTAGES

Filed May 26, 1965 Sheet 1 of 4

INVENTOR

ENZO ASCOLI

BY Emory L. Groff

ATTORNEY

INVENTOR
ENZO ASCOLI
BY Emory L. Groff Jr.
ATTORNEY

INVENTOR
ENZO ASCOLI

BY Emory L. Groff Jr.
ATTORNEY

INVENTOR

ENZO ASCOLI

BY Emory L. Groff Jr.

ATTORNEY

United States Patent Office 3,426,215
Patented Feb. 4, 1969

3,426,215
PROCESS AND DEVICE FOR PRODUCING FOUR SUBSTANTIALLY SINUSOIDAL VOLTAGES

Enzo Ascoli, Lausanne, Vaud, Switzerland, assignor to Paillard S.A., Vaud, Switzerland, a corporation of Switzerland Filed May 26, 1965, Ser. No. 459,034
Claims priority, application Switzerland, June 18, 1964, 8,000/64
U.S. Cl. 307—83 7 Claims
Int. Cl. H02j 5/16, 5/10

ABSTRACT OF THE DISCLOSURE

A source consisting of a pair of transformers having primary windings energized by alternating feed signals of a pilot frequency and each having plural secondary windings whereby the secondary windings constitute an output, for the source, of four alternating signals of a frequency the same as the pilot frequency and respectively offset in phase from each other by 90°, 180° and 270° four circuit groups each having an individual output with each circuit group having four circuits each, each of said circuits connected to receive at least one of the alternating pilot frequency current signals from the source, and each of the circuits having at least one diode polarized to pass only the peak of one alternation of the respective alternating pilot frequency current signal connected to that circuit. The diode outputs of the four circuits of each of the four circuit groups are connected to the individual output of the respective group whereby four alternating output currents offset in phase with respect to one another by 90° and having a frequency that is double the frequency of the pilot frequency feed signal are respectively provided at the individual outputs of the four circuit groups.

In certain applications it is necessary to be able to produce several substantially sinusoidal voltages of exactly the same frequency with predetermined phase relations.

A known device for providing deflection voltages for writing by co-ordinates is disclosed in Patent No. 3,182,126 issued to Enzo Ascoli on May 4, 1965, and requires a generator delivering two groups of four substantially sinusoidal voltages, the four voltages of each group being of the same frequency and of the same amplitude but spaced 90° in phase from one another, with the frequency of the voltages of the second group being double, and the amplitude being half, of those voltages of the first group, with the phase between a voltage of the first group and a voltage of the second group being nil, and including two continuous voltages of opposite polarity and equal to 1.25 times the amplitude of the voltages of the said second group of sinusoidal voltages.

In utilizing the circuit to produce voltages for tracing letters or signs it is imperative that the phase relationship between the different voltages is absolutely exact and constant to avoid errors in the writing of the characters and signs to be traced, especially the retracing of the track. The device described in the cited patent is an example of a case where several voltages presenting predetermined phasing between each other are necessary, but it is of course understood that the same necessity can occur in other fields of technique.

The present invention has for its subject a circuit for the formation of four substantially sinusoidal voltages displaced in phase with respect to each other by 90°, in accordance with which each of the different voltages is formed from portions of different alternating voltages of a frequency lower than that of the voltages to be obtained, characterized in that two voltages of the said lower frequency are used; the first of these voltages being a pilot voltage, and the second being shifted to phase by 90° with respect to the first; together with two other voltages of reversed phase to those of the first two voltages, and in which, for forming each of the four substantially sinusoidal voltages of a frequency double that of the pilot voltage, the peak of a wave of each of the voltages is selected during a time substantially equal to a quarter of the period of the wave under consideration and in which the appropriate peaks are assembled to constitute the voltage of double frequency.

One example of an embodiment of the circuit in accordance with the invention is described hereunder with reference to the annexed drawings in which:

FIG. 1 is a diagrammatic view showing several examples of characters with a double trace produced by a phase defect.

FIGS. 2*a* and 2*b* show graphically from waveform plots of voltage vs. time, the process of forming a voltage of double frequency from four voltages all of the same frequency but shifted in phase by $\pi/2$ (90°) with respect to one another in accordance with the invention.

Figure 1:
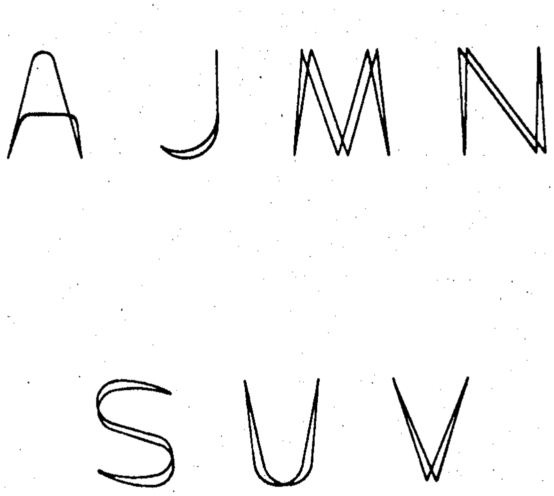
FIG. 1 shows a fault which is produced in the case of the cited prior art patent, when the phase relations between the different voltages representing the traces of the characters are not exactly maintained.
Figure 2A:
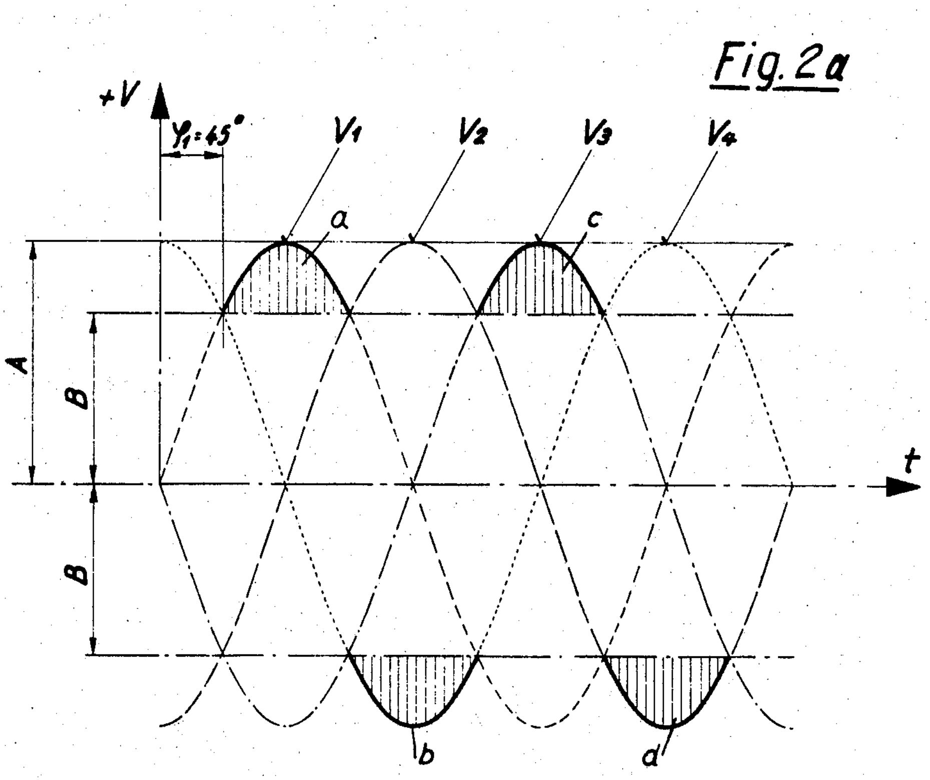
Figure 2B:
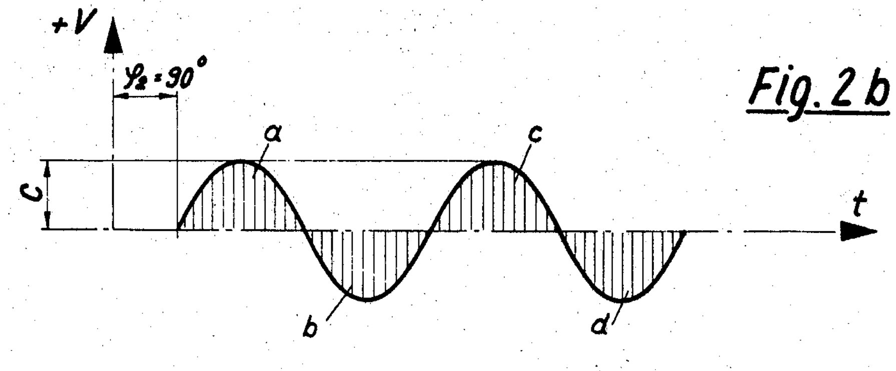

FIGS. 2*a* and 2*b* illustrate the manner of forming a substantially sinusoidal voltage derived from four sinusoidal voltages of the same basic frequency but offset by 90° with respect to one another. FIG. 2*a* graphically shows these four basic voltages, designated V1, V2, V3 and V4. The secondary voltage is shown in FIG. 2*b* and has a frequency which is double that of the primary voltages V1 to V4. This secondary voltage is formed by selection of the peaks of one wave of each of the voltages V1 to V4, the said peaks being used during a time substantially equal to a quarter of the period of the basic voltage.

Thus, the hatched portion *a* of a positive half-wave of the voltage V1, the portion *b* of a negative half-wave of the voltage V4 the phase of which is retarded by 90° with respect to V1, the portion *c* of the positive half-wave of the voltage V3 which is offset by 180° with respect to V1, and finally the portion *d* of the negative half-wave of V2 the phase of which is in advance by 90° with respect to V1, are successively used.

It can be seen that it is easy, from a technical point of view, to select the hatched portions *a, b, c* and *d* of the respective waveforms as they can be switched by means of a rectifier in series with a bias voltage the value of which is indicated by B in FIG. 2*a*. The peak value of the alternating voltage is indicated by A. The rectifier is connected in such manner that it only conducts when the difference between the instantaneous value of V1 and the bias voltage B is, for example positive. A simple calculation shows that to obtain only the portions *a, b, c* and *d* having a duration equal to a quarter of the period of the corresponding sinusoidal voltage it is necessary that the polarization constant B is equal to $A/2$.

It should be noted that the curve obtained, as shown in FIG. 2*b*, is not exactly sinusodial. It does however closely approach this form, and in numerous applications minor variations of the form of the curve are unimportant.

Figure 3:
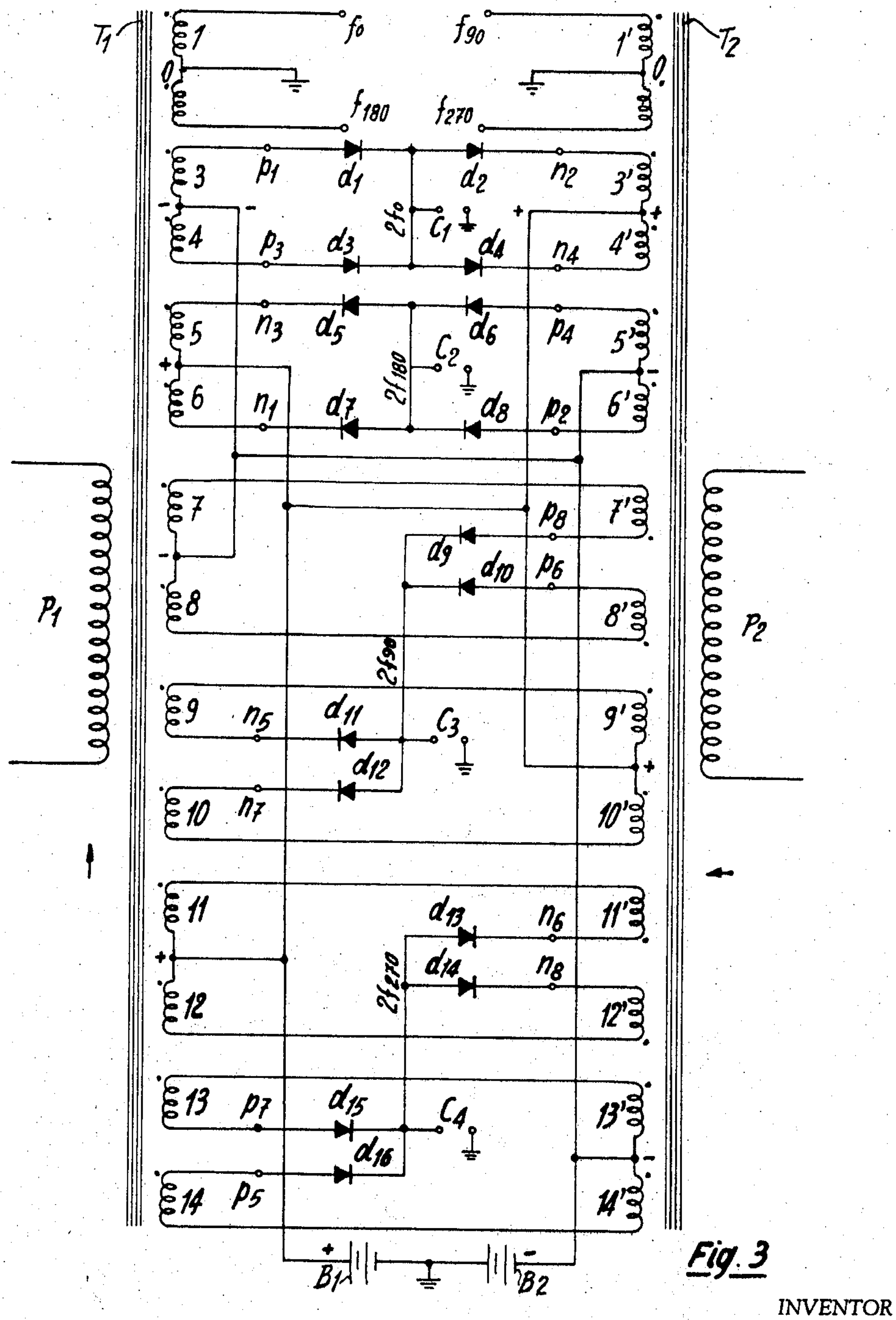
FIG. 3 is a circuit diagram of a generator for putting the process of the invention into practice

FIG. 3 shows a circuit diagram for producing voltages of the form shown in FIGS. 2*a* and 2*b*. The circuit comprises two identical transformers T1 and T2 each having a primary winding P1 and P2 respectively, with fourteen secondary windings. The secondary windings of the transformer T1 are denoted 1 to 14 respectively, while those of the transformer T2 are denoted 1' to 14', respectively.

The windings P1 and P2 are fed by two sinusoidal voltages of the same amplitude but shifted in phase with respect to one another by 90°. It is necessary that the phasing of these two voltages shall be very precise to ensure that the secondary voltage outputs are also correctly phased.

The windings 1 and 2 of the transformer T1 are connected in series and their common point is connected to ground, so as to form a center-tapped single winding. The free end of the winding 1 provides a voltage $f0$ with respect to ground which is in phase with the voltage feeding the winding P1 and out of phase by 180° with the voltage $f180$ appearing at the free end of the winding 2.

The windings 1' and 2' are connected in a similar manner, so that they also provide voltages of opposite phase and because of the difference in phasing by $\pi/2$ of the feed voltages of the windings P1 and P2, the voltages $f90$ and $f270$ provided by 1' and 2' are out of phase by 90° and 270° respectively with respect to the voltage appearing at $f0$.

The windings 3 and 4 are connected in series, as are the windings 3' and 4'. The connecting point between 3 and 4 is biased negatively with respect to ground by a D.C. source B2, while the point of connection of the windings 3' and 4' is biased positively by the D.C. source B1. The free end of the winding 3 is connected to the corresponding winding 3' via two diodes $d1$ and $d2$. Likewise the free end of the winding 4 is connected to 4' via two diodes $d3$ and $d4$. The junction of $d1$ and $d2$ is connected to the junction of $d3$ and $d4$ and to a terminal C1.

The diodes $d1$ to $d4$ are connected in such a manner as to oppose the passage of current coming from the bias sources B1 and B2. However, when the voltage at the terminals of one of the secondary windings, 3, 4, 3' or 4' is greater than the bias voltage, current flows through the associated diode, so that the potential of terminal C1 is equal to the difference between the voltage induced in a winding and the bias voltage during the time when this winding voltage is greater than the bias voltage.

Since the arrangement of the turns of the windings 3, 4, 3' and 4' is similar to that of the windings 1, 2, 1' and 2', except for the inclusion of the bias voltages, the voltages applied to diodes $d1$ to $d4$ are respectively offset in phase by 90°, from each other as shown for the signals V1 to V4 in FIG. 2a. Consequently, the voltage at the terminal C1 is in accordance with the curve of FIG. 2b. This potential designated by $2f0$ has a frequency double that of the potential $f0$ of the free end of winding 1, and is in phase with respect to it at the commencement of every second cycle of $2f0$.

The windings 5, 6, 5' and 6' are respectively connected via diodes $d5$ to $d8$, with the junction of these diodes being connected to a terminal C2. The circuit is similar to that connected to terminal C1, with the only differences being that the bias voltages are reversed and consequently that the diodes are also reversed. There is thus obtained between ground and the terminal C2 a voltage $2f180$ similar to the voltage delivered at terminal C1 but inverse with respect thereto, that is to say displaced in phase by 180°.

The number of turns of the windings 3 to 6 and 3' to 6' and the voltage of the sources B1 and B2 are chosen in such a manner that, as explained in connection with FIG. 2a, the bias voltage is equal to the maximum amplitude A of the voltage in the windings 3 to 6 and 3' to 6' divided by $\sqrt{2}$.

The generator of FIG. 3 must furnish four voltages or currents of a frequency double that of the feed voltage, these four voltages being necessarily out of phase with each other by 90°, and it is also necessary to provide two other voltages out of phase by 90° and 270° with respect to the voltage provided by the terminal C1. These two voltages $2f90$ and $2f270$ appear at terminals C3 and C4 respectively, and are each obtained by the aid of four secondary windings of each of the transformers. The circuit for producing these two other voltages is the same as for the voltages $2f0$ and $2f180$ appearing at terminals C1 and C2 respectively, but the voltage between the diodes and ground must be 45° out of phase with respect to the corresponding voltage at terminal C1. This 45° shift is easy to obtain by connecting the secondary winding 7 of a transformer with the winding 7' of transformer T2. These two windings 7 and 7' supply voltages of the same amplitude, and as these two voltages are 90° out of phase with respect to one another the derivatives of these two voltages are out of phase by 45°.

The circuit supplying the voltage $2f90$ to the terminal C3, which voltage is 90° in advance of that on C1, comprises four diodes $d9$ to $d12$, these diodes being connected, on the one hand to the terminal C3 and on the other hand, to a terminal of a bias source by the intermediary of two windings of each of the transformers T1 and T2. Likewise, $d9$ to $d10$ are connected to the negative terminal of the source B2 by the intermediary of windings 7' and 7 and 8' and 8 respectively. Also $d11$ and $d12$ are respectively connected to the positive terminal of the source B1 by the intermediary of windings 9, and 9' and 10 and 10'.

The terminal C4 is fed in the same manner as the terminal C3, but the diodes $d13$ to $d16$ are reversed, together with the connections to the bias sources B1 and B2. Thus at C4 a potential $2f270$ is obtained which is symmetrical to that delivered at terminal C3, that is to say it is offset by 180° with respect to this latter potential.

The apparatus described with reference to FIG. 3 furnishes, from two sinusoidal voltages of the same frequency and out of phase by 90° one with respect to the other, two groups of four voltages, with the first group of voltages $f0$, $f90$, $f180$ and $f270$, all substantially sinusoidal, the four voltages of each group being of the same frtquency and amplitude and 90° out of phase with respect to one another, and the voltages $2f0$, $2f90$, $2f180$ and $2f270$ of the second group being of double the original or feed voltage frequency and also 90° out of phase with respect to one another. In a particular embodiment of the invention it is desired that the amplitude of the voltages of double frequency be equal to half the amplitude of the voltages of the single frequency. In the circuit shown, calculation shows that this result is obtained if the number of turns of the windings 1, 2 and 1', 2' is equal to $(2-\sqrt{2})$ times the number of turns of the windings 3 to 6 and 3' to 6' and the windings 7 to 14 and 7' to 14' must each have a number of turns equal to that of the windings such as 3 divided by $\sqrt{2}$. The process and device in accordance with the invention does not employ inductors or capacitors, so that the phase relations and the frequency ratio remain rigorously constant, even if the base frequency varies. In known processes, these relations of phase and frequency ratio are rigorously constant only if the base frequency is constant and of a predetermined value, that is to say if the oscillatory circuit employed operates always at its resonance frequency.

It should be noted that voltages different from those mentioned above are present in the generator shown in FIG. 3, and can be of use in certain applications. For example, points $p1$ to $p8$ and $n1$ to $n8$ are at alternating voltages superposed on a positive or negative bias from the source B1 or B2 respectively, and these voltages with respect to the voltage applied to the primary winding P1, are successively 45° out of phase. These different voltages can be employed to form deflection voltages to produce numbers and letters, for example on a cathode ray tube.

Figure 4:
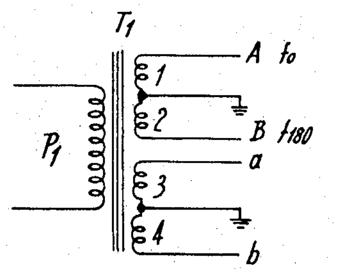
FIGS. 4 to 9 are schematic circuit diagrams showing variations of the generator of FIG. 3.
Figure 5:
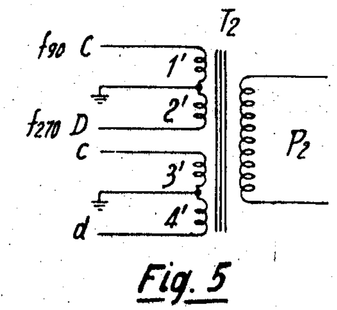

The generator in accordance with FIG. 3 comprises two transformers each having fourteen secondary windings, but voltages can also be obtained from this generator by using simpler transformers having four secondary windings in combination with resistance bridges, The two transformers, shown in FIGS. 4 and 5 each comprise a primary winding P1 and P2 respectively, and four secondary windings numeraled 1 to 4 and 1' to 4' respectively.

As in the generator which has just been described, the windings P1 and P2 are fed by two sinusoidal voltages of the same amplitude, but out of phase one with respect to the other by 90°.

The windings 1, 2, 1' and 2' provide, as in the example of FIG. 3, voltages of the same frequency as the primary current and provide between them the 90°, 180° and 270° out of phase relationship.

The secondary windings 3 and 4, and 3' and 4' respectively, of the transformers T1 and T2 are connected together in the same manner as the windings 1, 2 and 1' and 2' respectively. The free ends of the windings 3, 4, 3' and 4' have been designated respectively by *a*, *b*, *c* and *d*.

Figure 6:
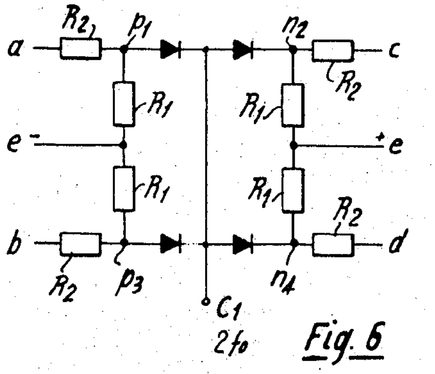

The elementary circuit represented in FIG. 6 comprises four diodes connected to an outlet terminal C1 by one of their poles, the other pole of each diode being connected via the resistance R2 to one end *a*, *b*, *c* or *d* of a secondary winding of T1 or of T2. For clarity of design, these connections have not been shown but are indicated in FIG. 6 by the sign referring to the end of the secondary winding to which each resistance R2 must be connected. The four diodes are also each connected by another resistance R1 to a source of bias voltage at the terminals $e-$ and $e+$ respectively. The terminal $e-$ is at a negative potential with respect to ground while the potential of $e+$ is positive. These two potentials are of equal value and opposite polarity.

Each diode of the circuit in accordance with FIG. 6 is thus submitted to a steady bias by the resistance R1 and receives an alternating voltage via resistance R2. These resistances and the values of the voltages applied are chosen in such a manner that each diode only passes the peak of a wave of the alternating voltage which is applied to it via the respective resistance R2. By reason of the 90° out of phase relationship between the feeding voltages from the transformers T1 and T2 and of the opposition of phase of the voltages from the two continuous secondary windings of each transformer, the diodes pass, the positive alternating peaks and negative out of phase peaks so that the terminal C1 delivers an alternating current $2f0$ of double frequency and in phase every two cycles with the current that appears at terminal A of the transformer T1.

Figure 7:
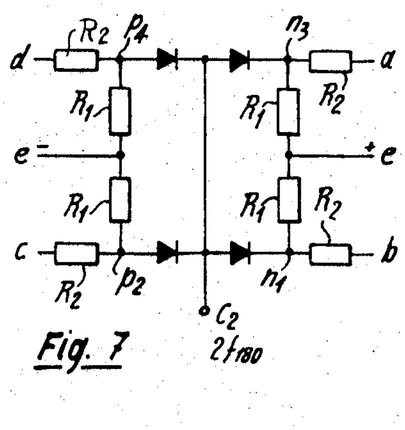

FIG. 7 represents a second circuit which is similar to that of FIG. 6, with the exception that the biases $e+$ and $e-$ are reversed with respect to the connections to the secondary windings. This circuit at the terminal C2 provides a voltage $2f180$ which is out of phase by 180° with respect to the voltage obtained at C1 and is of the same frequency.

Figure 8:
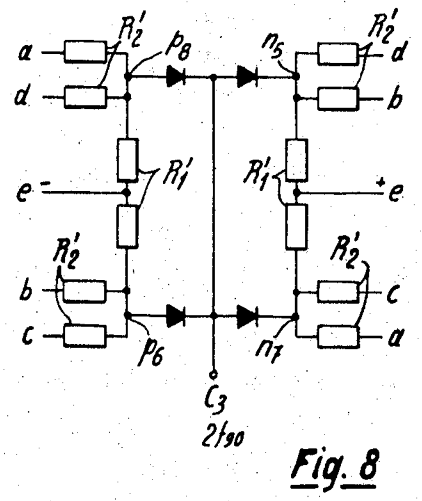
Figure 9:
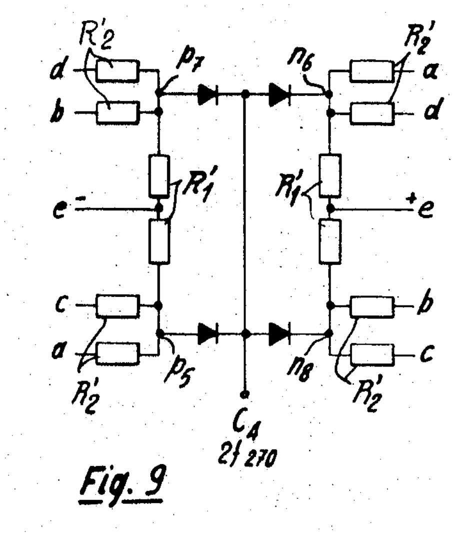

FIGS. 8 and 9 refer to two other circuits for obtaining voltages of the same frequency as that of C1 but out of phase by 90° and 270° with respect to the signal at terminal C1. The voltage $2f90$ which is out of phase by 90° is obtained at the terminal C3 of the voltage $2f270$ which is out of phase by 270° is obtained at the terminal C4. The principle of operation of the circuits of FIGS. 8 and 9 is similar to that of the circuits of FIGS. 6 and 7 but the resistance R2 of these latter circuits are replaced by two resistances R2' for each diode, one of which is connected to a secondary winding of one transformer, and the other of which is connected to a secondary winding of the other transformer, as indicated by the reference characters on the terminals. The two resistances R2' add two voltages which are out of phase by 90° and thus produce at their junction an intermediate voltage which is out of phase by 45°.

It is evident that in the circuit described the resistance connections produce losses and that the output is less than that of FIG. 3. However, this is without importance from a practical point of view, if the magnitudes of the electrical outputs required are small.

I claim:

1. Apparatus for producing at least four alternating output currents offset in phase with respect to one another by 90° and having a frequency that is double the frequency of feed signal, means comprising a source energized by said feed signal means of a pilot frequency and having four outputs; four alternating current signals of a frequency the same as the pilot frequency and respectively offset in phase from each other by 90°, 180° and 270° produced by said source respectively at said four outputs; four groups of four circuits; first, second, third and fourth outputs respectively for said four groups; said four circuits of each group connected to receive said four alternating pilot frequency current signals from said four outputs; at least one diode in each of said circuits of each group polarized to pass only the peak of one alternation of the respective alternating pilot frequency current signal connected thereto; and the four circuits of each of the four groups connected to the respective first, second, third and fourth outputs whereby a current is produced at each of said last mentioned outputs comprised of the addition of the four peaks of alternations delivered by the four circuits connected thereto.

2. Apparatus for producing at least four alternating output currents offset in phase with respect to one another by 90°, comprising a pair of transformers having primary windings respectively energized by two substantially sinusoidal electric currents of the same frequency but offset in phase from each other by 90°, said transformers each having a first secondary winding with a center tap, a first output, a first pair of diodes connecting the respective ends of the first secondary winding of one transformer to said first output, a second pair of diodes connecting the respective ends of the first secondary winding of the other transformer to said first output, two oppositely polarized D.C. sources respectively connected between a common reference potential and the center taps of said first secondary windings, whereby a first output current having a frequency double that of said electric currents energizing said primary windings is provided between said first output and the common reference potential, a second secondary winding having a center tap on each of said transformers, a second output, third and fourth pairs of diodes connected opposite in polarity to said first and second pairs of diodes and respectively connecting said second secondary windings to said second output, in a similar manner, the center taps of said second secondary windings of the respective transformers connected to the opposite D.C. sources from the respective first secondary winding, whereby a second output current opposite in phase to the first output current is provided between said second output and the common reference potential, the said transformers comprising eight secondary windings on each of said transformers connected together in four groups of four windings each, each of said groups comprising two of said secondary windings of one transformer and two of said secondary windings of the other transformer connected in series circuit and connected to one of said two D.C. sources, a third output, a fourth output, two of said groups connected to said third output and the other two groups connected to said fourth output, and the polarization of the said secondary windings of the groups being such that third and fourth output currents of the same frequency as said first output current but respectively offset 90° ahead and behind the first output current are provided respectively between said third and fourth outputs and the common reference potential.

3. Apparatus as set fourth in claim 1 in which each of said four circuits of each group is connected to receive at least one of said four alternating current signals from said source.

4. Apparatus as set forth in claim 1 including a source of polarized current, and in which each of said circuits includes at least one resistance means connected between said diode and the respective output of said source, and another resistance means connected between said diode and said source of polarized current.

5. Apparatus as set forth in claim 1 including a source of polarized current, said four circuits forming each of said groups including four of said diodes each having first and second terminals, the first terminal of each of the four diodes of each group connected to the respective first, second, third or fourth group output, a resistance element, the second terminal of each of the diodes connected through a said resistance element to one of said four source outputs delivering one of said four alternating pilot frequency current signals, another resistance element, the second terminal of each of the diodes also connected through a said another resistance element to said source of polarized current.

6. Apparatus for producing four substantially sinusoidal output currents offset in phase with respect to one another by 90° comprising, two transformers having primary windings respectively energized by two substantially sinusoidal currents offset in phase from each other by 90°, two secondary windings with center taps on each of said transformers, four groups of output terminals, four groups of at least four diodes each connected to a respective one of said four group output terminals, two sources of polarized current each having a pair of terminals, one terminal of each polarized source connected to the center taps of the said secondary windings of the two transformers, four first resistance elements, four second resistance elements, the first group of four diodes connected by said four first resistance elements to one secondary winding of each of the two transformers and by said four second resistance elements to the other terminals of each polarized source, the second group of four diodes connected similar to said first group of four diodes but with the connections to the said other terminals of the polarized sources reversed, pairs of resistance elements, each diode of the third group of four diodes connected by a said pair of resistance elements to one end of a secondary winding of each of the two transformers, four third resistance elements, two diodes of the third group connected by two of said third resistance elements to the said other terminal of one of the polarized sources, and the other two diodes of the third group connected by two of said third resistance elements to the said other terminal of the other of the polarized sources, and the fourth group of four diodes connected similar to said third group of four diodes but with the connections to the said other terminals of the polarized sources reversed.

7. Apparatus as set forth in claim 2 in which the voltages of the two polarized D.C. sources are equal, the sinusodial voltages of each half of the center tapped secondary windings are of the same value, and the peak alternating voltage of the secondary windings in $\sqrt{2}$ times the D.C. source voltage.

References Cited

UNITED STATES PATENTS

| | | | |
|---|---|---|---|
| 2,440,465 | 4/1948 | Ferguson | 321—65 X |
| 2,867,731 | 1/1959 | Henszey | 321—65 X |

ORIS L. RADER, *Primary Examiner.*

W. E. DUNCANSON, *Assistant Examiner.*